(12) United States Patent
Wakely et al.

(10) Patent No.: US 9,456,088 B2
(45) Date of Patent: Sep. 27, 2016

(54) EFFICIENT TRANSMISSION OF VOICE DATA BETWEEN VOICE GATEWAYS IN PACKET-SWITCHED NETWORKS

(71) Applicant: Paradigm Services Limited, London (GB)

(72) Inventors: Christopher Benjamin Wakely, Herts (GB); Kevin John Warbrick, Herts (GB)

(73) Assignee: Paradigm Services Limited, London (GB)

( * ) Notice: Subject to any disclaimer, the term of this patent is extended or adjusted under 35 U.S.C. 154(b) by 102 days.

(21) Appl. No.: 14/297,841

(22) Filed: Jun. 6, 2014

(65) Prior Publication Data
US 2014/0362850 A1  Dec. 11, 2014

(30) Foreign Application Priority Data

Jun. 7, 2013  (EP) .................................. 13 002 951

(51) Int. Cl.
| | | |
|---|---|---|
| *H04L 5/14* | (2006.01) | |
| *H04B 7/00* | (2006.01) | |
| *H04J 3/16* | (2006.01) | |
| *H04J 3/00* | (2006.01) | |
| *H04M 7/00* | (2006.01) | |
| *H04L 29/06* | (2006.01) | |

(52) U.S. Cl.
CPC .......... *H04M 7/0066* (2013.01); *H04L 65/605* (2013.01); *H04L 65/607* (2013.01); *H04L 65/608* (2013.01); *H04L 65/80* (2013.01)

(58) Field of Classification Search
CPC .. H04W 76/04; H04L 12/5695; H04L 29/06; H04B 7/18584
See application file for complete search history.

(56) References Cited

U.S. PATENT DOCUMENTS

| | | | | |
|---|---|---|---|---|
| 7,792,092 B1* | 9/2010 | Olkkonen | ........... | H04L 12/6418 370/352 |
| 7,836,124 B2* | 11/2010 | Saxena | ................... | H04L 29/06 709/204 |
| 2001/0005382 A1* | 6/2001 | Cave | ....................... | H04L 29/06 370/466 |

(Continued)

FOREIGN PATENT DOCUMENTS

WO  WO 03/043280 A2  5/2003

OTHER PUBLICATIONS

European Search Report dated Oct. 13, 2014 (seven (7) pages).

(Continued)

*Primary Examiner* — Faruk Hamza
*Assistant Examiner* — Abu-Sayeed Haque
(74) *Attorney, Agent, or Firm* — Crowell & Moring LLP

(57) ABSTRACT

A voice gateway receives packets transmitting voice data between two voice gateways, each received packet includes header data and voice media payload, means for establishing a voice trunk between the two voice gateways based on the header data of the received packets. The voice media payloads of the received packets are extracted and combined into a single packet, the single packet including for a voice call a dedicated channel data of the established voice trunk comprising an identifier of the respective voice call and the voice media payload of the respective voice call. A single set of header data is added to the single packet, the single set of header data includes base information for synchronizing the flow of data between the two voice gateways. The single packet is transmitted to the receiving voice gateway via the voice trunk.

12 Claims, 5 Drawing Sheets

(56) References Cited

U.S. PATENT DOCUMENTS

| | | | | |
|---|---|---|---|---|
| 2001/0036161 | A1* | 11/2001 | Eidenschink | H04B 7/18584 370/316 |
| 2003/0212999 | A1* | 11/2003 | Cai | H04L 12/66 725/119 |
| 2009/0003570 | A1* | 1/2009 | Sindhwani | H04M 7/0072 379/157 |
| 2010/0002688 | A1* | 1/2010 | Yeom | H04L 12/5695 370/352 |
| 2012/0250509 | A1* | 10/2012 | Leung | H04W 76/04 370/235 |

OTHER PUBLICATIONS

K. El-Khatib et al., "Multiplexing Scheme for RTP Flows Between Access Routers; draft-ietf-avt-multiplexing-rtp-01.txt", Internet Engineering Task Force, vol. avt., No. 1, Oct. 22, 1999, (twenty-six (26) pages) XP 15015630 A.

M. Spencer et al. "IAX: Inter-Asterisk eXchange Version 2; rfc5456.txt", Inter-Asterisk Exchange Version 2; rfc5456.TXT, Internet Engineering Task Force, IEFT; Standard, Internet Society (ISOC) 4, Rue Des Falaises, Feb. 27, 2010, pp. 1-101, XP 15068199A.

* cited by examiner

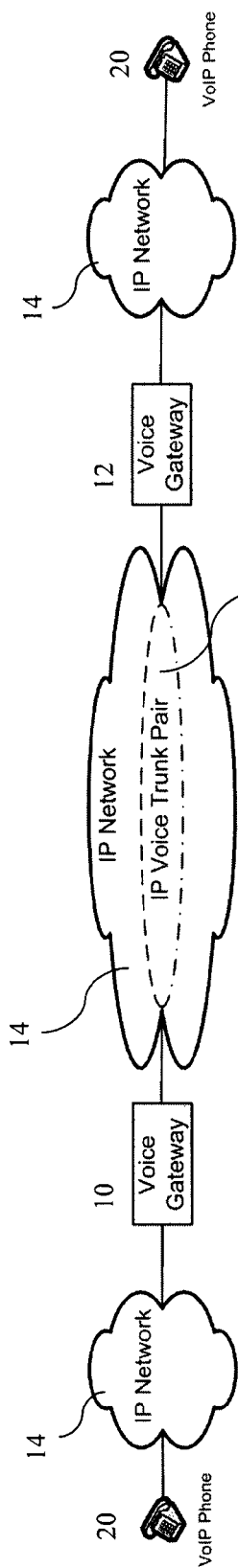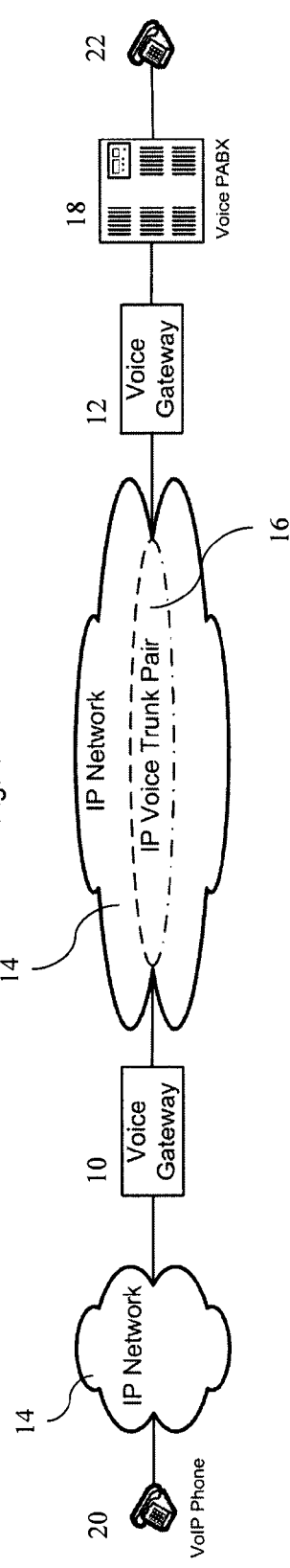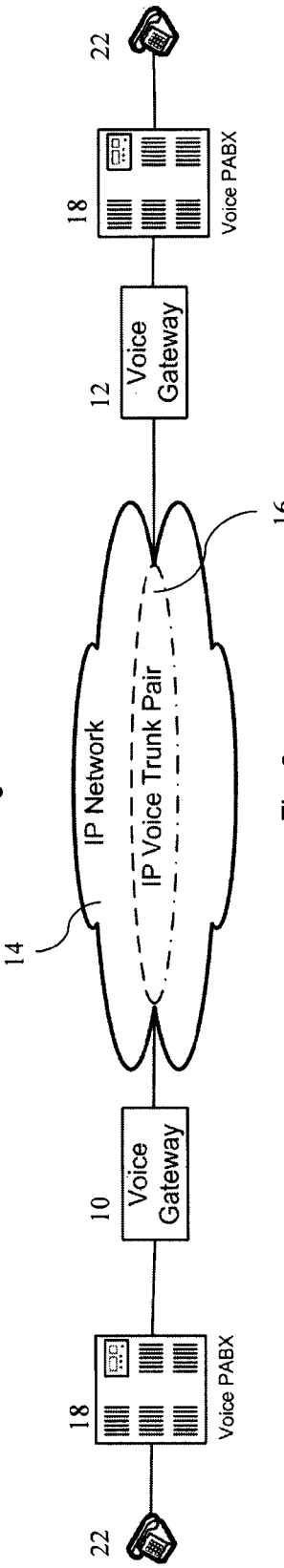

EFFICIENT TRANSMISSION OF VOICE DATA BETWEEN VOICE GATEWAYS IN PACKET-SWITCHED NETWORKS

TECHNICAL FIELD

The invention relates to the efficient transmission of voice data between voice gateways in packet-switched networks such as the internet.

BACKGROUND

Voice communication over a packet-switched network using IP (Internet Protocol) is known as VoIP (Voice over Internet Protocol). For carrying multiple VoIP calls across an IP (Internet Protocol) network is to individually packetize each VoIP call and transmit it separately across the network. This means that each call has to carry the full IP header overhead, particularly the substantial IP/UDP (Used Datagram Protocol)/RTP (Real Time Protocol) header overheads, which leads to very poor bandwidth efficiency. In low bandwidth, high latency networks like satellite communication networks, such an overhead may cause efficiency and latency problems.

Several key current approaches—cRTP (compressed Real-time Transport Protocol, RFC2508 of the IETF), EcRTP (Enhanced cRTP, RFC3545 of the IETF) and ROHC (Robust Header Compression, RFC3095 of the IETF)—are known which attempt to improve the bandwidth efficiency by compressing the VoIP headers. However, all suffer from several key problems:

VoIP call interruption due to a loss of context at the decompressor.

The possibility of causing 'Congestion Collapse' due to the need to refresh the context at the decompressor with full, or partial, headers being retransmitted from the compressor.

The inability to deal efficiently with the loss, or misordering, of IP packets between the compressor and the decompressor.

In the following, the issues of these known approaches for improving bandwidth efficiency are explained in detail.

cRTP (RFC 2508)—The key issue with Compressed RTP is that if the base header context at the decompressor is lost then it must request full headers to be sent by the compressor, and whilst it is awaiting this new context, it must discard all VoIP packets, as it is unable to reliably decompress the IP headers for these packets. This causes the following key problems in the area of the invention:

Where the RTT (Round Trip Time) is considerable, e.g. Satellite links, the period of discard; whilst the updated context is awaited could be very substantial, >0.5 seconds. Clearly this will have a major effect on the quality of the voice call(s).

The response of this method to request full headers to be sent by the compressor for all the effected voice calls is extremely likely to cause a form of 'Congestion Collapse' to occur.

Although this method can be used with both IPv4 (IP version 4) and IPv6 VoIP calls, it cannot be used with both simultaneously, e.g. IPv4 VoIP phone to an IPv6 VoIP phone, which is a condition which is very likely to occur in the future as networks migrate from IPv4 to IPv6.

Implementations of the cRTP protocol are known to be very processor intensive and therefore it is highly likely that this would cause capacity issues in the area of the invention where multiple calls are to be supported simultaneously.

EcRTP (RFC 3545)—Enhanced Compressed RTP attempts to deal with the 'Loss of Context' issue in cRTP by transmitting all header changes N+1 times, where N is a characterisation of the quality of the link. This causes the following key problems in the area of the invention:

The selection of a suitable value for N is very difficult where a variable transmission medium is concerned, e.g. Satellite links, and this is likely to result in either excessive bandwidth wastage, where N is too high or repeated loss of context, where N is too low. Both conditions are likely to cause a form of 'Congestion Collapse' to occur.

Even if a suitable value for N is determined, and maintained, there is no guarantee in this method that the context will not be lost.

Although this method can be used with both IPv4 and IPv6 VoIP calls, it cannot be used with both simultaneously, e.g. IPv4 VoIP phone to an IPv6 VoIP phone, which is a condition which is very likely to occur in the future as networks migrate from IPv4 to IPv6.

As implementations of the cRTP protocol are known to be very processor intensive, given the changes for EcRTP it is very likely that it will be the same. Given this it is highly likely that this would cause capacity issues in the area of the invention where multiple calls are to be supported simultaneously.

ROHC (RFC 3095)—Robust Header Compression uses detailed knowledge about the fields in IP, UDP and RTP headers to identify the optimum data to be transferred, in order to keep the contexts current. This causes the following key problems in the area of the invention:

Although this complex protocol can deal with minor losses of context, there are still cases where it will be necessary to request an updated full, or partial, header from the compressor. As before if the compressor and the decompressor are linked via a high latency bearer, this is likely to have an effect on the voice quality of the effected voice call(s).

As ROHC was primarily designed for Cellular links, one of its primary assumptions is that the channel between the compressor and decompressor must maintain packet ordering, this assumption cannot be guaranteed in a normal IP network.

Although this method can be used with both IPv4 and IPv6 VoIP calls, it cannot be used with both simultaneously, e.g. IPv4 VoIP phone to an IPv6 VoIP phone, which is a condition which is very likely to occur in the future as networks migrate from IPv4 to IPv6.

SUMMARY OF INVENTION

Therefore, exemplary embodiments of the present invention provide an efficient transmission of voice data between voice gateways in packet networks such as the internet.

Generally, the proposed solution according to the invention is that where different VoIP, or Circuit Switched voice flows are between two voice gateways, then instead of packetizing the data for each voice call individually, the voice media 'pay-loads' could be combined into a single packet, which would then have a single set of IP headers added. The data required for onward transmission/reception of the voice calls to/from the IP, or Circuit Switched, networks supported by the voice gateways, would only need to be transmitted once as the call is established and would then be stored at the two voice gateways for the duration of the call.

An embodiment of the invention relates to a voice gateway for transmitting voice data to a receiving voice gateway in a packet network by establishing a voice trunk, wherein the voice gateway comprises means for receiving packets transmitting voice data between the two voice gateways, wherein each received packet comprises header data and voice media payload from one or more voice flows, means for establishing a voice trunk between the two voice gateways based on the header data of the received packets, means for extracting and combining the voice media payloads of the received packets into a single packet, wherein the single packet comprises for a voice call a dedicated channel data of the established voice trunk comprising an identifier of the respective voice call and the voice media payload of the respective voice call, means for adding a single set of header data to the single packet, wherein the single set of header data comprises base information for synchronizing the flow of data between the two voice gateways, and means for transmitting the single packet to the receiving voice gateway via the voice trunk.

The voice gateway may further comprise means for establishing the voice trunk pair on admission of the first call, and/or means for establishing the voice trunk on association between the voice gateways.

The voice gateway can further comprise a DAMA (Demand Assigned Multiple Access) modem and means for controlling the required bandwidth for voice calls.

The means for controlling the required bandwidth for voice calls can be further adapted for determining DAMA congestion and for clearing voice calls from the voice trunk depending on determined DAMA congestion and/or can be further adapted for detecting voice activity and/or suppressing silence of voice calls and for controlling the bandwidth requirements for voice calls depending on detected voice activity and silence.

The means for controlling the required bandwidth for voice calls can be further adapted for selecting voice calls to be cleared, for which the probability is minimized that the voice gateways at either end of the voice trunk attempt to pre-empt the same voice call at the same time.

The voice gateway can further comprise means for prioritizing voice calls and means for Call Admission Control (CAC) based on the prioritizing of voice calls and voice call clearing selection methods.

The means for prioritizing voice calls can comprise a Multi-level Precedence and Pre-emption (MLPP) controller, which is adapted to allocate MLPP values to voice calls.

The means for call admission control can comprise a CAC controller, which is adapted to clear voice calls depending on their allocated MLPP values and under control of the means for controlling the required bandwidth for voice calls.

A further embodiment of the invention relates to a method for transmitting voice data between voice gateways according to the preceding claims in a packet network by establishing a voice trunk comprising the acts of: receiving packets transmitting voice data between the voice gateways, wherein each received packet comprises header data and voice media payload, extracting and combining the voice media payloads of the received packets into a single packet, wherein the single packet comprises for each voice call dedicated channel data of the voice trunk comprising an identifier of the respective voice call and the voice media payload of the respective voice call, adding a single set of header data to the single packet, wherein the single set of header data comprises base information for synchronizing the flow of data between the voice gateways, and transmitting the single packet reliably via the voice trunk.

The method may further comprise the act of controlling the required bandwidth for voice calls, particularly wherein the act of controlling the required bandwidth for voice calls further comprises the acts of determining DAMA congestion and clearing voice calls from the voice trunk depending on determined DAMA congestion and/or Voice Activity Detection (VAD) and/or suppressing silence of voice calls and controlling the bandwidth requirements for voice calls depending on detected voice activity and silence, wherein particularly the act of controlling the required bandwidth for voice calls further comprises the acts of selecting voice calls to be cleared, for which the probability is minimized that the voice gateways at either end of the voice trunk attempt to pre-empt the same voice call at the same time.

The method may further comprise the act of identifying calls to be dropped when the voice gateways can no longer communicate in order to maximize the number of retained calls when the gateways reestablish communication.

The method may further comprise the acts of prioritizing voice calls and call admission control based on the prioritizing of voice calls and voice call clearing selection methods, wherein particularly the act of prioritizing voice calls comprises the act of allocating MLPP values to voice calls, wherein particularly the act of call admission control comprises the act of clearing voice calls depending on their allocated MLPP values and under control of the act of controlling the required bandwidth for voice calls.

A further embodiment of the invention relates to a computer program, which implements a method according to the invention and as described herein and enabling efficient voice data transmission between voice gateways in a packet-switched network when executed by a computer.

According to a further embodiment of the invention, a record carrier storing a computer program according to the invention may be provided, for example a CD-ROM, a DVD, a memory card, a diskette, or a similar data carrier suitable to store the computer program for electronic access.

Another embodiment of the invention relates to a computer being configured by a computer program of the invention and as described above for implementing a voice gateway according to the invention and as described herein.

A yet further embodiment of the invention relates to a voice data packet created by a method of the invention and as described herein, wherein the voice data packet contains base information required to synchronize the flow of voice data between two voice gateways according to preceding claims, wherein the base information contain the following fields: a Trunk Identifier (ID) being be unique across a network supporting voice trunks between two voice gateways according to preceding claims; a Timestamp for allowing buffering and de-jittering of voice trunk packets at a receiving voice gateway; a Sequence Number for allowing detection of lost, and misordered, packets at the receiving voice gateway. The base information can comprise 32 or less octets These and other aspects of the invention will be apparent from and elucidated with reference to the embodiments described hereinafter.

The invention will be described in more detail hereinafter with reference to exemplary embodiments. However, the invention is not limited to these exemplary embodiments.

BRIEF DESCRIPTION OF DRAWINGS

FIG. 1 shows an embodiment with a VoIP to VoIP call handled between two voice gateways according to the invention;

FIG. 2 shows an embodiment with a VoIP to Circuit Switched Voice call handled between two voice gateways according to the invention;

FIG. 3 shows an embodiment with a Circuit Switched Voice to Circuit Switched Voice call handled between two voice gateways according to the invention;

DETAILED DESCRIPTION

Figure 4:
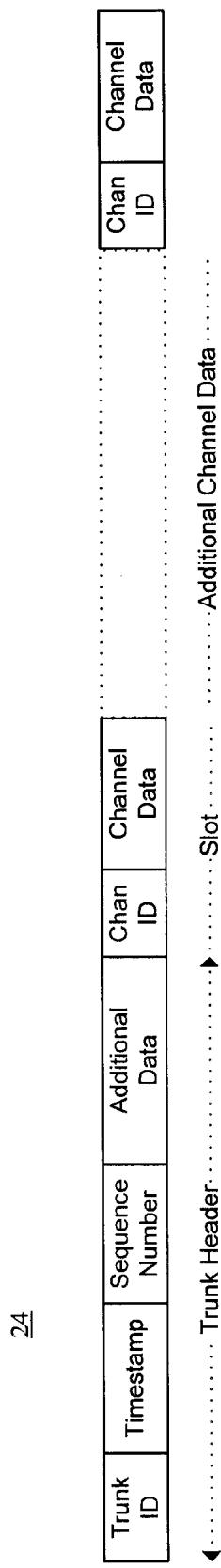
FIG. 4 shows an embodiment of an IP Voice Trunk Packet Data Structure used by a voice gateway according to the invention.

In the following, functionally similar or identical elements may have the same reference numerals.

The standard way of carrying multiple VoIP calls across an IP network is to individually packetize each VoIP call and transmit it separately across the network. This means that each call has to carry the full IP header overhead, which not only leads to very poor bandwidth efficiency, but also causes efficiency and latency problems in low bandwidth, high latency networks.

The invention proposes a solution to these problems by using voice gateways, where different VoIP, or Circuit Switched voice, flows are between two of these voice gateways. The individual voice media payloads are combined into a single (IP) packet stream and further: The required data for onward transmission/reception of the voice calls to/from the IP, or Circuit Switched, networks supported by the voice gateways would only need to be transmitted once as the call is established and would then be stored at the two voice gateways for the duration of the call. This storage of the required call data will allow highly efficient transport of voice payload. This storage of the required call data will remove the requirement for the required call data, or part thereof, to be retransmitted on loss or misordering of IP packets.

In order to accomplish this, a voice gateway according to the invention establishes a 'voice trunk' with a further voice gateway according to the invention. Voice data received from phones are then processed and packed into the single IP packet stream, which is transmitted over the established voice trunk between the two voice gateways. The single packet stream between the two voice gateways over the voice trunk requires less IP header overhead and can, therefore, better use the available bandwidth for voice data transmission resulting in a better bandwidth efficiency compared to standard VoIP data transmission. Also, latency can be reduced so that the invention is particularly suitable for application with high latency networks like satellite communications networks. Thus, the invention generally achieves a more efficient transmission of voice data in packet switched networks such as IP based networks like the internet.

FIGS. 1 to 3 show three different constellations for transmitting voice data between voice terminals (VoIP phones 20 or analog/digital phones 22) over an IP network as a specific example for a packet-switched network. Each constellation employs voice gateways 10, 12 according to the invention for handling the transmission of voice data in the IP network. In each constellation, a 'voice trunk', also called herein a High Efficiency IP Voice Trunk (HEVT) 16, in the IP network 14 is established between the two voice gateways 10 and 12.

The IP network 14 can be for example a LAN (Local Area Network) or a WAN (Wider Area Network) employing a protocol of the Internet Protocol Suite such as IP, UDP, RTP for transmitting and controlling the flow of data packets. It should be noted that the present invention is not restricted to be applied in IP networks, but can be used in each packet-switched network, which shows nearly identical or similar drawbacks as IP networks with regard to voice communication in packet-switched networks and as described in the introduction.

In the constellation of FIG. 1, a HEVT 16 is established between two voice gateways 10 and 12 to transmit one or more voice calls between a plurality of VoIP phones 20, which transmit their voice data over IP networks 14. The voice gateways 10, 12 are also connected to the IP networks 14, and each gateway comprises an IP network interface for receiving and transmitting voice data from or to the VoIP phones 20. In the constellation of FIG. 2, a HEVT 16 is established between two voice gateways 10 and 12 to transmit one or more voice calls between a plurality of VoIP phones 20 and analog/digital phones 22, which is connected to a Voice PABX 18. The Voice PABX 18 is connected via a standard Circuit Switched network with the second voice gateway 12, which comprises a standard Circuit Switched network interface for receiving and transmitting voice data from or to the Voice PABX 18 over the standard Circuit Switched network. In FIG. 3, a HEVT 16 is established between two voice gateways 10 and 12 to transmit one or more voice calls between a plurality of analog/digital phones 22, each being connected to a Voice PABX 18. Each of the Voice PABX 18 is connected to one of the voice gateways 10 or 12, each of which comprises a standard Circuit Switched network interface for receiving and transmitting voice data from or to the Voice PABX 18 over the standard Circuit Switched network.

The outline of the operation of a voice gateway 10, 12 and the HEVT 16 will be explained in the following with regard to FIGS. 4 and 5: FIG. 5 shows a block diagram of a voice gateway 10 with an interface 25 being adapted to support multiple voice networks, where the technology of these voice networks could support both standard Circuit Switched and VoIP protocols. The gateway 10 can transmit or receive voice data over this interface 25. A voice data packets transceiver 26 receives and/or transmits voice data packets from or to the interface 25. A HEVT interface 28 establishes a HEVT 16 over an IP network 14 with another voice gateway depending on the destination information contained in received voice data for transmitting voice data. Voice data packets are processed by a HEVT packet payload processor 30 and a HEVT packet header data processor 32. Single packets created by the processors 30, 32 are transmitted by a HEVT packet transceiver 34 over the HEVT interface 28. Single packets received over a HEVT from the another voice gateway are routed over the HEVT interface 28 to the HEVT packet transceiver 34, which passes the received single packets further to the processors 30, 32 for creating voice data packets to be transmitted via the voice data packets transceiver 26 and the interface 25 into the voice network, with which the destination voice terminal is connected.

Multiple voice gateways 10, 12 as shown in FIGS. 1 to 3 would communicate using a partial mesh of HEVTs 16. An instance of the HEVT 16 would carry simplex (half duplex) calls between two voice gateways 10, 12. HEVTs 16 would be established in pairs to allow support of full duplex calls between two voice gateways 10, 12. The full duplex pair of HEVTs 16 could either be established on receipt of the first call between the voice gateways 10, 12, or run in a minimal state waiting for the first call. The choice will depend on the requirements of the supported voice service, in particular the balance between Call Establishment Time and efficient bandwidth usage.

Figure 5:
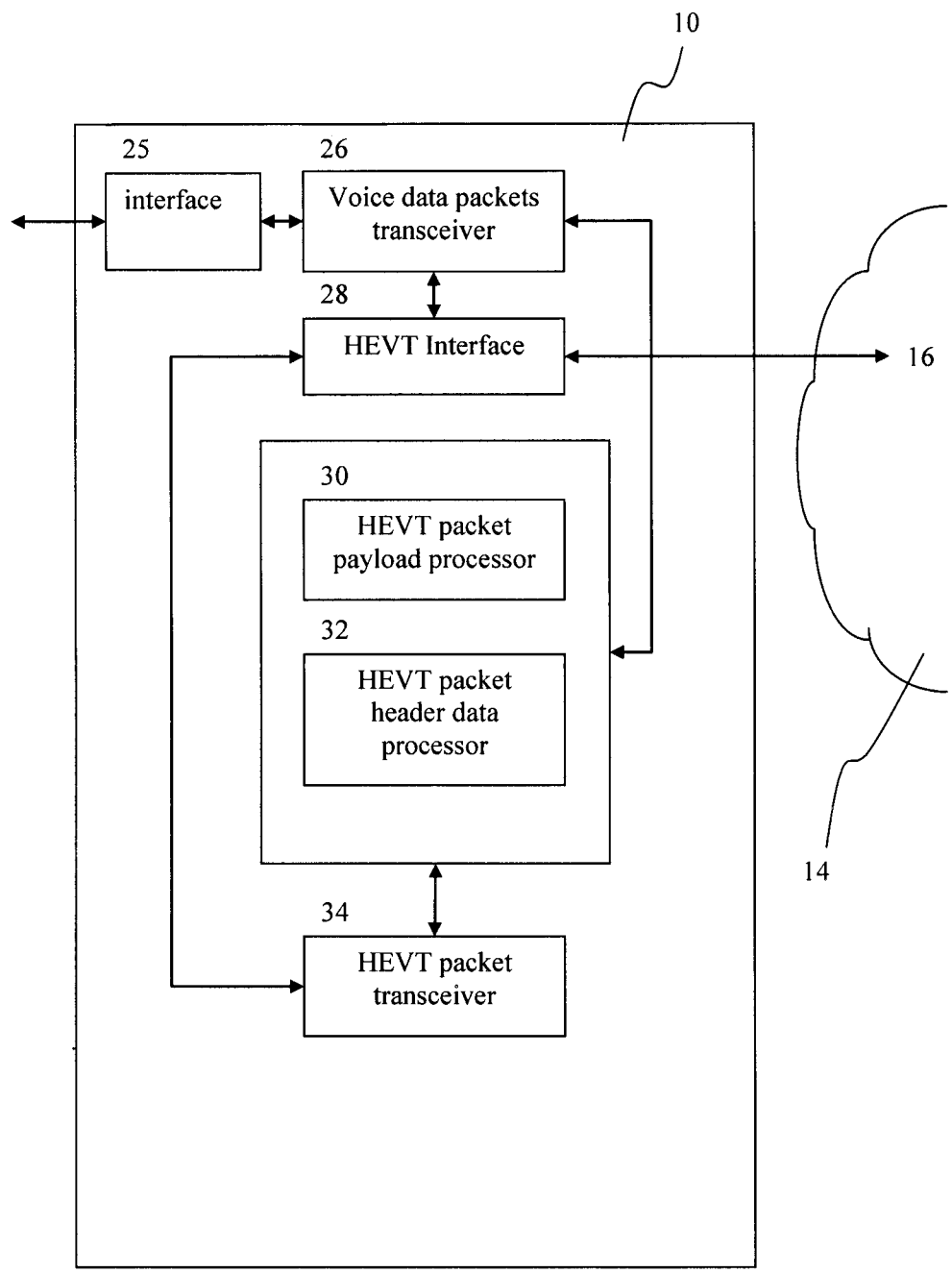
FIG. 5 shows a block diagram of an embodiment of a voice gateway according to the invention.

FIG. 4 shows a HEVT data packet 24 being transmitted over a HEVT 16 and its frame structure. The packet 24 is created by the HEVT packet payload processor 30 and the HEVT packet header data processor 32. The Trunk header of the packet 24 serves to synchronize the flow of voice data over the HEVT 16 between the two voice gateways 10 and 12. The header contains the following fields: Trunk ID being unique across the IP network 14 supporting the HEVTs 16; Timestamp for allowing buffering and de-jittering of the trunk packets at the receiving voice gateway; Sequence Number for allowing detection of lost, and misordered, packets at the receiving voice gateway. The size of these fields will be implementation specific, however as they are 'shared' across all the voice calls on the voice trunk their effect on efficiency is minimal. If required it will be possible to protect the special frame header with various levels of error protection from simple Parity to a Cyclic Redundancy Check (CRC). The voice calls will be carried in channels within the HEVT data packet 24, as shown in FIG. 4. The voice channels will have a channel header containing the information required by the receiving gateway to identify the individual voice media stream. The channel header will as a minimum contain the channel id (Chan ID in FIG. 4) and given its criticality will be protected with some form of Parity, or CRC. A voice channel will be able to carry both voice setup data and voice media data during the call. Voice setup data will consist of base data for the call, e.g. Called Number, Calling Number etc. Voice setup data will be exchanged between the two voice gateways at the start of the call and given its critically will be protected by CRCs, and positively acknowledged.

On receipt of a call setup attempt, from an attached network, the HEVT interface 28 of the source voice gateway 10 will attempt to obtain the destination voice gateway 12 for the call. The destination voice gateway could be the same as the source voice gateway, i.e. the call is being switched between two locally attached networks. The source voice gateway 10 would obtain the destination voice gateway from its own tables, or remotely from a call route server. Once the destination voice gateway 12 is obtained the receiving voice gateway will if necessary establish a new HEVT pair with the destination voice gateway. The source voice gateway will allocate an available HEVT channel to the new call and will send the call voice setup data to the destination voice gateway. On successful receipt of the call voice setup data, the destination voice gateway will allocate an available HEVT channel, in the paired HEVT. The destination voice gateway will attempt a call setup to the destination called user. If the call setup attempt is successful the destination voice gateway will acknowledge the call and send any called voice setup data to the source voice gateway. On receipt of the called setup data the source voice gateway will acknowledge the completion of the HEVT channel establishment. The voice call can now precede with voice media data flowing between the source and destination voice gateways.

The establishing of HEVTs for transmitting voice data according to the invention has the following key advantages over prior technology:

As all required data is exchanged at the start of the call there is no possibility of a loss of context and therefore there is no possibility of frame losses causing multiple instances of valid voice media to be discarded.

A fundamental point of the invention is that context is always retained following one, or more, frame losses. This retains the efficient operation, because the required context per channel can be as small as a single channel id, which could be a single octet, whereas to guarantee that the context is always retained on a VoIP call would require in excess of 10 octets, if partial headers where to be used, or 40 octets if the full IP/UDP/TCP headers where to be used.

The HEVT frame special headers can be very short, less than 10 octets (Trunk ID (2), Timestamp (4), Sequence Number (2), Additional Data Length (1)), which is less that a single pair of UDP/RTP headers, 20 octets. As this special header will support multiple voice calls it adds very little real overhead to the carried voice calls. The solution is still efficient even if only one voice call is being carried.

As there is no need to request new context information following multiple frame losses, there is no risk of causing 'Congestion Collapse'.

As the HEVTs, and the associated voice gateways, are link layer and transmission media agnostic, it will be possible to support voice calls over all source, and destination link layer protocols and transmission media e.g. Circuit Switched to VoIP. The HEVTs, and associated voice gateways, are therefore ideally placed to support a seamless migration from Circuit Switched voice to VoIP carried over IPv4 or IPv6, as shown in FIG. 2.

As the source, and destination, voice gateways are only required to extract the voice media and possibly add standard IP headers, this will not add any abnormal processor load at either voice gateway. Given this it will be possible to support a substantial number of calls on a single voice gateway.

As described herein, the invention proposes to combine individual voice media payloads using a mechanism for aggregation of multiple voice calls into a single packet stream, a 'voice trunk'.

Figure 6:
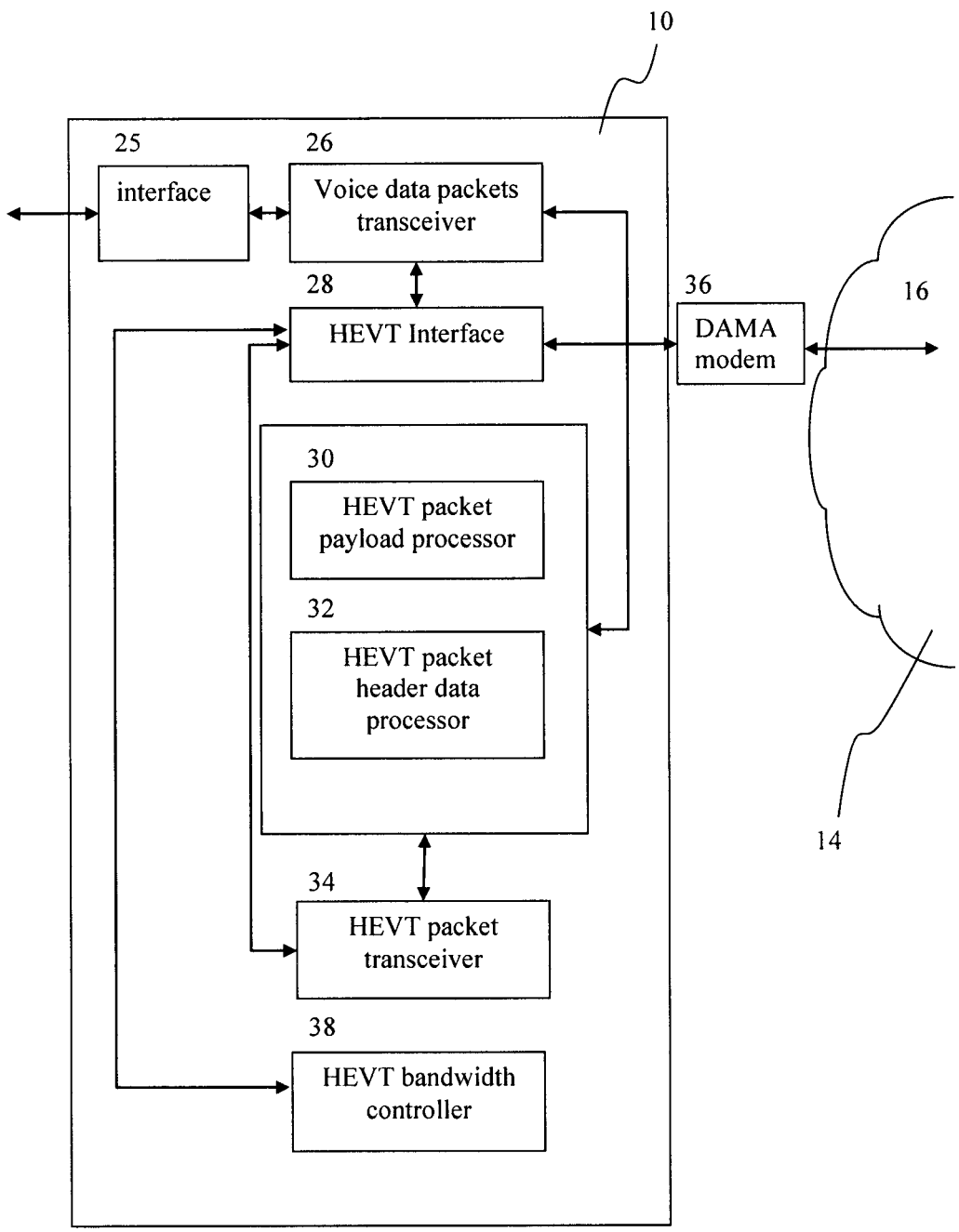
FIG. 6 shows a block diagram of an embodiment of a voice gateway with VAD support over DAMA according to the invention.

Next, an embodiment of the invention with VAD Support over DAMA Modems is described in detail and with reference to FIG. 6.

The high cost of satellite communications is driving the adoption of DAMA (Demand Assigned Multiple Access) modem systems. This works well with standard VoIP calls, however if Silence Suppression, or VAD (Voice Activity Detection), is enabled on the VoIP calls to improve their bandwidth efficiency, approximately a 40% improvement, various serious interaction issues can occur with the DAMA system.

The key problems suffered by a DAMA system in trying to support VAD/Silence Suppression, are as follows:

DAMA systems use asymmetric bandwidth allocation/de-allocation, in that as standard a DAMA system takes in the order of seconds to allocate new bandwidth, however it will de-allocate 'unused' bandwidth in approximately 50 ms, this means that a 'standard' VoIP call, using a 20 ms sample time, only has to be in VAD for 3 samples before the DAMA system will de-allocate its bandwidth. The effect is more serious if the VoIP call is using a 50 ms sample time, a common setting for VoIP calls over a satellite bearer, in that just one sample dropped by VAD will cause the DAMA system to de-allocate its bandwidth.

If there is insufficient bandwidth available in the local DAMA system, when the call comes out of VAD, then it is necessary for the local DAMA system to request the extra bandwidth from the global DAMA bandwidth 'pool'. In general this will take the order of seconds, many multiples of the sample time, before this new bandwidth is available for use, during which time the local DAMA system must queue all incoming VoIP packets. As VoIP calls individually take substantial bandwidth, and even more if the calls are encrypted, the size of these queues will result in very substantial increases in inter-packet latency and jitter.

If there are several VoIP calls passing over the same local DAMA system, it is likely that their cumulative effect will cause the queues generated, during the wait for bandwidth to be allocated, to be such that VoIP packets will be discarded by the local DAMA system, causing dropouts on all, i.e. not just the calls operating VAD, calls passing over this DAMA system.

If there is insufficient bandwidth available in the global DAMA bandwidth 'pool', when the call comes out of VAD, then the local DAMA system will be forced to discard VoIP call packets, causing dropouts on all, i.e. not just the calls operating VAD, calls passing over this DAMA system. This situation will only be resolved if more bandwidth becomes available in the global DAMA bandwidth 'pool', i.e. another DAMA system disconnects freeing up its bandwidth, or some of the existing VoIP calls clear down, which may occur due to unacceptable voice quality making them unusable.

The only current approach to this problem is for the DAMA system to monitor the VoIP signaling and then reserve sufficient fixed bandwidth for the duration of the call. This suffers from several key problems:

As the DAMA system reserves sufficient fixed bandwidth for the duration of the call, any Silence Suppression, or VAD, enabled by the call is effectively ignored, although the bandwidth freed up during VAD could be used by data applications running via the same local DAMA system.

As the DAMA system relies on monitoring the VoIP signaling, this approach will not work if the VoIP signaling is encrypted.

The proposed solution is that where different VoIP, or Circuit Switched voice, flows are between two voice gateways 10, 12 according to the invention and as described before, carried on a 'voice trunk' or HEVT 16, a mechanism for aggregation of multiple voice calls into a single packet stream between the voice gateways. It will be possible to allocate fewer slots, where a slot is a Channel ID and Channel Data as shown in FIG. 4, than the total number of calls, as the VAD activity may be averaged across all the supported calls. The capacity of the 'Voice Trunk' will be controlled so that with minimal queues, based on historical information on the supported calls, it will be possible to fully utilize the bandwidth savings from the DAMA system, without ever encountering the issues for standard VoIP calls.

As the proposed solution will use voice gateways, it will also be possible to detect periods of silence in voice calls, between devices which either do not support VAD or have not got it enabled, and suppress unnecessary 'Silence' transmissions occupying bandwidth on the 'voice trunk'. The receiving voice gateway would then generate 'Comfort Noise' for onward transmission to the remote voice device. This method will also work for voice calls between different types of voice systems, e.g. VoIP and Circuit Switched.

The outline of the operation of VAD Support over DAMA Modems is similar to the method described above with reference to FIG. 5. FIG. 6 shows an embodiment of the voice gateway 10, which also comprises the components of the gateway 10 of FIG. 5 and additionally a DAMA modem 36 for access to a DAMA system and a HEVT bandwidth controller 38 for monitoring the bandwidth allocated to the HEVT within the DAMA system. Setting up a new voice trunk pair 16 with the DAMA modem 36 could, as a worse case, take a maximum of approximately 4 seconds, 2 seconds in each direction, due to the DAMA system taking in the order of 2 seconds to allocate new bandwidth, however this delay will only be encountered once and as the new voice trunk 16 only requires similar bandwidth to a single VoIP call it is likely that the bandwidth will be available in at least one direction, greatly reducing this set up time. If sufficient bandwidth is currently believed to be available on the voice trunk pair 16 with the destination voice gateway 12, i.e. congestion has not yet been detected, then the source voice gateway 10 will immediately attempt to setup the new call in the voice trunk 16.

The DAMA system can be in one of 3 possible base states:

There is sufficient bandwidth available in the local DAMA system, e.g. bandwidth currently being used by other lower priority applications that the increased voice trunk can be set up immediately by displacing the low priority traffic. In a well sized DAMA system this should be the 'normal' case the majority of the time.

There is currently no bandwidth available in the local DAMA system, however bandwidth is available in the global DAMA bandwidth 'pool'. In this case there will be a period of approximately 2 seconds whilst the bandwidth is allocated to the local DAMA system. During this period the calls passing over the voice trunk, will experience slight variations in latency, however it should be possible to hide the majority of this using a suitably sized de jitter buffer at the receiving gateway.

There is currently no bandwidth available in the local DAMA system and there is no remaining bandwidth in the global DAMA bandwidth 'pool'. In this case as the DAMA system cannot respond to the increased demand, it must queue the 'excess bandwidth', which will cause a continued increase in latency in the packets forming the voice trunk. This continued increase in latency will be detected by the receiving gateway, by comparing the voice trunk packet timestamps, applied by the source gateway, against the receiving gateway's own time source, which is analyzed to provide a congestion indication. This will be signaled to the source gateway that the trunk has gone into congestion. The congestion indication analysis will ensure that this state is clearly differentiated from the standard DAMA bandwidth allocation state.

If, following a call setup, the voice trunk experiences congestion, i.e. either one, or both, voice gateways signal DAMA congestion, then the source and destination voice gateways will coordinate to identify call(s) to be cleared, in order to take the voice trunk out of congestion.

Ideally the voice trunk will be running with 'call priority', e.g. MLPP (Multi-level Priority and Pre-emption), which will enable the gateways to clear low priority call(s), allowing any higher priority calls to continue. As calls can use different voice codecs, which may use different bandwidths, it may be necessary to clear more than one call in order to take the voice trunk out of congestion. If congestion has already been detected on the voice trunk pair with the destination voice gateway and 'call priority' is being used, then the source voice gateway will check if the priority allocated to the new call is greater than at least one existing call on the voice trunk pair. If this is the case then the source voice gateway will pre-empted the existing call, and allow the new call to proceed. If the voice trunk is not using 'call priority, e.g. MLPP, this behavior will not be possible and any calls received whilst the voice trunk is congested shall be rejected. As calls can use different voice codecs, which may use different bandwidths, it may be necessary to clear more than one low priority call in order to allow the higher priority call to proceed. If several calls are pre-empted then the source voice gateway will use a selection method, which minimizes the probability of the voice gateways at either end of the voice trunk attempting to pre-empt the same call at the same time.

In the unlikely event that both voice gateways attempt to pre-empt the same call at the same time, a method exists by which a decision will be made as to which voice gateway gains the bandwidth, and which voice gateway has to select another call to pre-empt.

The voice call can now precede with voice media data flowing between the source and destination voice gateways. If the available bandwidth for the voice trunk pair decreases, then the DAMA system must queue the 'excess bandwidth', which will cause a continued increase in latency in the packets forming the voice trunk. This continued increase in latency will be detected by one, or both, of the voice gateways, which after analysis will signal to the other voice gateway that the trunk is congested. The two voice gateways will then coordinate to identify sufficient calls to be cleared, in order to take the voice trunk out of congestion. Ideally the voice trunk should be running with 'call priority', e.g. MLPP, which will enable the voice gateways to clear low priority call(s), allowing any higher priority calls to continue.

During normal operation the two voice gateways, at either end of a voice trunk, will monitor the 'occupancy' of the voice trunk, for example by means of the HEVT interface 28 or the HEVT bandwidth controller 38, and will adjust the bandwidth allocated to the voice trunk with their HEVT bandwidth controller 38 in order to fully utilize any VAD savings and release unused bandwidth for use by other applications on the local DAMA system, or to be returned to the global DAMA bandwidth 'pool' to make it available to the rest of the DAMA system. The bandwidth savings will naturally increase as the number of calls supported by a voice trunk, with the savings approaching the optimum 40%, for large voice trunks.

If the drop in the available bandwidth is such that the source, and destination, voice gateways are no longer able to communicate, then the two voice gateways will use a selection method, which identifies the same calls to be dropped, ensuring that the same calls are dropped by both voice gateways. When the available bandwidth has returned to a level that the source, and destination, voice gateways are able to communicate again, then the voice gateways will confirm which calls are still active.

The VAD Support over DAMA Modems according to the invention has the following key advantages over prior technology:

It enables VAD/Silence Suppression to operate between voice equipment across a DAMA system, thereby achieving substantial improvements to bandwidth efficiency.

As it uses voice gateways, it can detect periods of silence in voice calls, between devices which either do not support VAD or have it disabled, and suppress unnecessary 'Silence' transmissions occupying bandwidth on the 'voice trunk'. The receiving voice gateway would then generate 'Comfort Noise' for onward transmission to the remote voice device, thereby achieving substantial improvements to bandwidth efficiency across a DAMA system.

It minimizes voice quality degradation, during dynamic bandwidth reductions in a DAMA system.

As the HEVTs, and the associated voice gateways, are link layer and transmission media agnostic, it will be possible to support voice calls over all link layer protocols and transmission media, e.g. Circuit Switched to VoIP. The HEVTs, and associated voice gateways, are therefore ideally placed to support a seamless migration from Circuit Switched voice to VoIP carried over IPv4 or IPv6, as shown in FIG. 2.

This embodiment of the invention is intended to be used by the Multi-Level Secure (MLS) VoIP Gateway and the Secure Domain VoIP Gateway, where it will be a key enabler to allow efficient communication between these devices.

Figure 7:
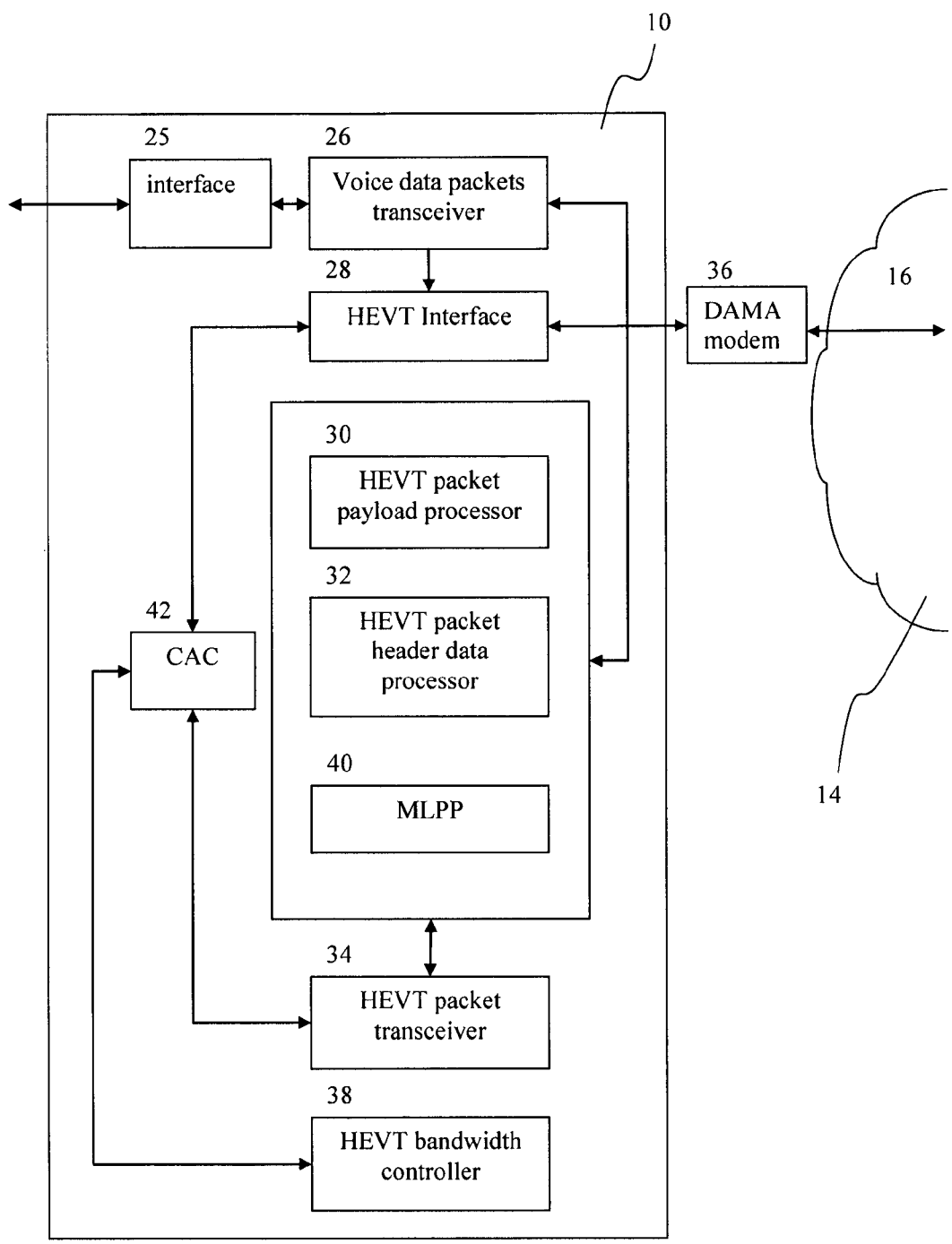
FIG. 7 shows a block diagram of an embodiment of a voice gateway with dynamic CAC support on IP networks and MLPP support on IP networks according to the invention.

Next, an embodiment of the invention with Dynamic CAC (Call Admission Control) Support on IP Networks is described in detail and with reference to FIG. 7.

The standard method of setting CAC is manual and assumes that there is a static bandwidth allocation across the supporting IP network. This works for static networks, however the bandwidth in satellite networks can vary dynamically due to various factors such as DAMA modem systems and rain fade, where any manual configuration method is unlikely to make best use of the available bandwidth.

In the following, a solution to this problem is described; where different VoIP, or Circuit Switched voice, flows, at various MLPP (Multi-level Priority and Pre-emption) levels, are between two voice gateways according to the invention and as described above.

The individual voice media payloads, at various MLPP levels, are combined using a mechanism for aggregation of multiple voice calls into a single IP packet stream, a 'voice trunk' or HEVT according to the invention and as described before, and further: The method according to the invention and described in the following can enable the maximum sustainable number of calls CAC can support between any two voice gateways to be discovered. The method according to the invention and described in the following can also enable the maximum sustainable number of calls CAC can support between any two voice gateways to be maintained during dynamic changes in the available bandwidth. Furthermore, the method according to the invention and described in the following can minimize packet loss, and therefore voice quality degradation, during dynamic bandwidth reductions.

The problem addressed by the following embodiment of invention is one of controlling the maximum number of Voice over IP (VoIP) calls that can be supported by the variable connection bandwidth experienced across a packet network, or set of interconnected packet networks. This allows correct operation of Call Admission Control (CAC) and call pre-emption under congestion conditions.

The proposed solution overcomes the current limitation of unmanaged call dropping under the conditions of network congestion by assigning Multi-level Priority and Pre-emption (MLPP) to the calls and allowing low priority calls to be preferentially dropped. This embodiment of the invention creates a mechanism by which the voice services supported by IP networks can be controlled under conditions of varying bandwidth availability. The proposed embodiment will also avoid the additional bandwidth consumed by the current method of creating and monitoring VoIP 'probe' packets in potentially congested networks, where an increase in the accuracy of the monitoring method has a potential detrimental effect on the voice service due to bandwidth competition.

There is no standard way to dynamically set the maximum number of calls CAC (Call Admission Control) can support across an IP network, or set of interconnected IP networks. The key current approach, which is to use VoIP 'Probe' packets to detect excessive delay, jitter etc, suffers from several key limitations:

If the probe flow encounters problems, it will prevent any more calls being setup on that route. However, if the bandwidth deceases, it relies on the quality of the voice calls dropping to such a level that sufficient calls release.

It does not employ any form of MLPP/call priority. In the event of it encountering congestion, calls will be randomly corrupted, until sufficient calls release.

It uses extra bandwidth to 'Probe' the network. Where bandwidth is limited, it will cause congestion to occur and thus reduce voice quality.

The accuracy of its view of the network is directly related to the frequency of the 'Probes'. However, the higher the probe frequency the more likely this method is to cause congestion, thus reducing voice quality.

The dynamic CAC (Call Admission Control) according to an embodiment of the invention can utilize the ECN (Explicit Congestion Notification) bits, present in both IPv4 and IPv6 headers, which were introduced to improve the efficiency of TCP transmissions by allowing these transmissions to be 'Throttled-Back' when congestion is indicated by the setting of the ECN bits, rather than relying on the IP transmission network to discard packets, thus giving substantial improvements to the effective TCP through-put by reducing the level of frame retransmission.

The proposed solution is that where different VoIP, or Circuit Switched voice, flows are between two voice gateways, carried on a HEVT, a mechanism for aggregation of multiple voice calls into a single packet stream between the voice gateways, then the ECN bits will be used to indicate congestion and therefore allow the voice gateways to reduce the HEVT bandwidth requirement dynamically, e.g. by increasing the compression or dropping low priority calls. By this method it will be possible for the voice gateways to 'dynamically' determine the available voice bandwidth between them.

The outline of the operation of Dynamic CAC Support on IP Networks using MLPP is as follows: An instance of a voice gateway 10, 12 (FIGS. 1-3) will support multiple interfaces to voice networks, where the technology of these voice networks may support both standard Circuit Switched and VoIP protocols. Multiple voice gateways 10, 12 will communicate using a partial mesh of HEVTs 16. HEVTs 16 will be established in pairs to allow support of full duplex calls between two voice gateways, as shown in FIGS. 1 to 3. On receipt of a call setup attempt, from an attached network, a MLPP controller 40 of the source voice gateway 10 will allocate an MLPP value to the call. The MLPP value may be obtained from a number of possible sources including; i) Prefixed digits to the called number, ii) MLPP signalling from the attached network, iii) Default MLPP value for the attached network, iv) Default MLPP value for the source voice gateway. The setting of a non-default higher MLPP value will only be allowed if the originated user is identified as having this privilege, which may be via a number of possible sources including; i) Originating User's Calling Number, ii) Originating User's VoIP Profile, iii) Maximum default MLPP value for the attached network, iv) Maximum default MLPP value for the source voice gateway. The source voice gateway 10 will obtain the destination voice gateway 12 from its own tables, or remotely from a call route server. Once the destination voice gateway 12 is obtained the source voice gateway 10 will, when necessary, establish a new HEVT pair 16 with the destination voice gateway 12. If sufficient bandwidth is currently available on the HEVT pair 16 with the destination voice gateway 12, i.e. congestion has not yet been detected, then the source voice gateway 10 will immediately setup the call, sending the MLPP value as part of call voice setup data to the destination voice gateway 12

Following a call setup, if the HEVT bandwidth controller 38 experiences congestion, i.e. either one, or both, voice gateways 10, 12 detect repeated ECN congestion indications, then the source and destination voice gateways 10, 12 will coordinate to identify low priority MLPP call(s) to be cleared, in order to take the HEVT 16 out of congestion and thus to allow any higher priority calls to continue. Clearing calls is performed by means of adjusting the CAC 42, the number of new calls that can be accepted is controlled by the HEVT bandwidth controller 38 according to different call selection methods. If the last call, which forced the HEVT 16 into congestion, was a low priority MLPP call it does not have to be the call which is cleared. The call which is cleared will depend on the call selection method used. Calls can use different voice codecs, which may use different bandwidths, it may be necessary to clear more than one low priority MLPP call in order to take the HEVT 16 out of congestion. If congestion has already been detected on the HEVT pair 16 with the destination voice gateway 12, then the source voice gateway 10 will check if the MLPP value allocated to the new call is greater than at least one existing call on the HEVT pair 16. In this case the source voice gateway 10 will pre-empted the existing call, and allow the new call to proceed. Calls can use different voice codecs, which may use different bandwidths, it may be necessary to clear more than one low priority MLPP call in order to allow the higher priority MLPP call to proceed. If several calls are pre-empted then the source voice gateway 10 will use a selection method, which minimizes the probability of the gateways 10, 12 at either end of the HEVT 16 attempting to pre-empt the same call. In the unlikely event that both gateways 10, 12 do attempt to pre-empt the same call then there exists a method by which a decision is made as to which gateway 10, 12 gains the bandwidth, and which gateway 10, 12 has to select another call to pre-empt.

The voice call can now precede with voice media data flowing between the source and destination voice gateways. If the available bandwidth for the HEVT pair 16 decreases, such that the voice trunk experiences congestion, i.e. either one, or both, gateways 10, 12 detect repeated ECN congestion indications, then the source and destination voice gateways 10, 12 will coordinate to identify sufficient low priority MLPP calls to be cleared, in order to take the HEVT 16 out of congestion, and thus to allow any higher priority calls to continue. If the drop in the available bandwidth is such that the source, and destination, voice gateways 10, 12 are no longer able to communicate, then the two gateways will use a selection method, which identifies the same lower priority MLPP calls to be dropped, so as to ensure that the same calls are dropped by both gateways 10, 12. When the available bandwidth has returned to a level that the source, and destination, voice gateways 10, 12 are able to communicate again, then the gateways 10, 12 will confirm which calls are still active.

The Dynamic CAC (Call Admission Control) Support on IP Networks according to the invention has the following key advantages over prior technology:

The method according to the invention enables the maximum number of supportable calls, and their associated bandwidth, between any two voice gateways to be discovered.

The method according to the invention enables the maximum number of calls to be maintained between any two voice gateways during dynamic changes in the available bandwidth.

The method according to the invention minimizes packet loss, and therefore voice quality degradation, during dynamic bandwidth reductions.

As the HEVTs, and the associated voice gateways, are link layer and transmission media agnostic, it will be possible to support voice calls over all link layer protocols and transmission media e.g. Circuit Switched to VoIP. The HEVTs, and associated voice gateways, are therefore ideally placed to support a seamless migration from Circuit Switched voice to VoIP carried over IPv4 or IPv6, as shown in FIG. 2.

This embodiment of the invention is intended to be used by the MLS (Multi-Level Secure) VoIP Gateway and the Secure Domain VoIP Gateway, where it will be a key enabler to allow efficient communication between these devices.

Next, an embodiment of the invention with MLPP Support on IP Networks is described in detail and with reference to FIG. 7.

There is no standard way to support MLPP (Multi-Level Priority and Pre-emption) across an IP network, or set of interconnected IP networks, which leads to the need to dedicate bandwidth for all the MLPP markings to ensure that key calls can always be made. This causes major efficiency problems, together with very complex configurations across interconnected IP networks.

In the following, a solution to this problem is described; where different VoIP, or Circuit Switched voice, flows, at various MLPP levels, are between two voice gateways according to the invention and as described above.

The individual voice media payloads, at various MLPP levels, are combined using a mechanism for aggregation of multiple voice calls into a single IP packet stream, a 'voice trunk' or HEVT according to the invention and as described before, and further: The method according to the invention and described in the following would enable optimum use of the available bandwidth for any mix of MLPP marked calls. The method according to the invention and described in the following would allow higher priority calls to be accepted even if the bandwidth were congested, by pre-empting lower priority calls. The method according to the invention and described in the following would retain the higher priority calls if the bandwidth decreased, by dropping the lower priority calls.

There is no standard way to support MLPP (Multi-Level Priority and Pre-emption) across an IP network, or set of interconnected IP networks.

The key current approach, which is to allocate different DSCP (Differentiated Services Code Point) packet markings to the different MLPP levels, suffers from several key problems: There is no standard way that different DSCP queues can interact to allow a higher DSCP marking to reallocate bandwidth from a lower DSCP marking. This leads to the need to dedicate bandwidth for all the DSCP/MLPP markings to ensure that key calls can always be made. If some form of CAC (Call Admission Control) is not employed individually for each of the DSCP/MLPP markings there is a risk that calls will be randomly corrupted, due to one, or more, DSCP/MLPP queues being over subscribed. This causes major efficiency problems in the low bandwidth networks, where MLPP is most required. This causes very complex configurations across interconnected IP networks.

There is only one standard approach to supporting MLPP across an IP network, or set of interconnected IP networks; however there are a number of 'single manufacturer' solutions for supporting MLPP between VoIP phones on a 'standalone' IP network. These all have major issues when applied to the area of this invention.

The key methods and their issues are as follows:

DSCP (RFC 2474 & RFC 2475)—The key issue with using different DSCP packet markings to carry different MLPP levels, is that this is not what DSCP packet markings were intended for and therefore this causes a number of key problems in the area of the invention:

There is no standard way that the different DSCP queues can interact in such a way that a higher MLPP marking, e.g. FLASH, can be reallocated bandwidth from the DSCP marking allocated to a lower MLPP marking, e.g. ROUTINE.

This leads to the need to dedicate bandwidth for all the DSCP/MLPP markings to ensure that high priority calls can always be made.

If some form of CAC (Call Admission Control) is not employed individually for each of the DSCP/MLPP markings there is a risk that calls will be randomly corrupted, due to one, or more, DSCP/MLPP queues being over subscribed.

This causes major efficiency problems in the low bandwidth networks, where MLPP would be most required.

Single Manufacturer—The key issue with the various 'Single Manufacturer' MLPP solutions is that they are only really designed to support the use of MLPP between compatible VoIP phones attached to the IP network and therefore this causes a number of key problems in the area of the invention:

No ability to deal with congestion caused by calls transiting the IP network, as there is no mechanism to clear the call, or calls, causing the congestion.

No ability to give individual external calls access to MLPP facilities.

No support for MLPP signalling on Military circuit switched networks.

Class-Of-Restriction lists (COR lists)—The key issue with the COR Lists is that they reserve bandwidth for 'Priority' users, which can not be used by other 'Non-Priority' users if it is not being used. This causes a number of key problems in the area of the invention:

The reservation of bandwidth to a subset of the users will clearly reduce the efficiency of the bandwidth utilisation.

One of the fundamental principles of MLPP is that a user with MLPP privileges is given the ability to increase the priority of their call, to force it through a congested network, if they believe the importance of the call justifies this action. In MLPP there is never an assumption that because a user is important that every call they make is also important.

No ability to give individual external calls access to COR facilities.

No support for MLPP signalling on Military circuit switched networks.

The solution for this problem as proposed by the invention is that where different VoIP, or Circuit Switched voice, flows are between two voice gateways, then MLPP would be operated over a HEVT according to the invention, a mechanism for aggregation of multiple voice calls into a single IP packet stream between the voice gateways. The voice gateways would then control which calls are admitted onto the voice trunk dependent on the number of calls, and the MLPP priority of the incoming call. The data required for support of the MLPP for the voice calls to/from the IP, or Circuit Switched, networks supported by the voice gateways, would only need to be transmitted once as the call is established and would then be stored at the two voice gateways for the duration of the call.

This has substantial advantages in that there is no wasted bandwidth, e.g. all the available bandwidth could be used for any single MLPP level or for any combination of MLPP levels and this method will also perform correctly if the bandwidth decreases, in that it could retain the higher priority calls by dropping the lower priority calls.

The outline of the operation of MLPP Support on IP Networks is as follows: An instance of a voice gateway 10, 12 (FIGS. 1-3) will support multiple interfaces to voice networks, where the technology of these voice networks may support both standard Circuit Switched and VoIP protocols. Multiple voice gateways 10, 12 will communicate using a partial mesh of HEVTs 16. HEVTs 16 will be established in pairs to allow support of full duplex calls between two voice gateways, as shown in FIGS. 1 to 3. On receipt of a call setup attempt, from an attached network, a MLPP controller 40 of the source voice gateway 10 will allocate an MLPP value to the call. The MLPP value may be obtained from a number of possible sources including; i) Prefixed digits to the called number, ii) MLPP signalling from the attached network, iii) Default MLPP value for the attached network, iv) Default MLPP value for the source voice gateway. The setting of a non-default higher MLPP value will only be allowed if the originated user is identified as having this privilege, which may be via a number of possible sources including; i) Originating User's Calling Number, ii) Originating User's VoIP Profile, iii) Maximum default MLPP value for the attached network, iv) Maximum default MLPP value for the source voice gateway. The source voice gateway 10 would obtain the destination voice gateway 12 from its own tables, or remotely from a call route server. Once the destination voice gateway 12 is obtained the source voice gateway 10 will, if necessary, establish a new HEVT pair 16 with the destination voice gateway 12.

If sufficient bandwidth is available on the HEVT pair 16 with the destination voice gateway 12, then the source voice gateway 10 will setup the call, sending the MLPP value as part of call voice setup data to the destination voice gateway 12. If sufficient bandwidth is not available on the HEVT pair 16 with the destination voice gateway 12, then the source voice gateway 10 will check if the MLPP value allocated to the new call is greater than at least one existing call on the HEVT pair 16. If this is the case then the source voice gateway 10 will pre-empted the existing call, and allow the new call to proceed. If several calls could be pre-empted then the source voice gateway 10 should use a selection method, which minimizes the probability of the gateways 10, 12 at either end of the HEVT 16 attempting to pre-empt the same call at the same time. In the unlikely event that both gateways 10, 12 do attempt to pre-empt the same call at the same time, then there needs to be a method by which a decision can be made as to which gateway 10, 12 gains the bandwidth, and which gateway 10, 12 has to select another call to pre-empt. The voice call will now precede with voice media data flowing between the source and destination voice gateways 10, 12. If the available bandwidth for the HEVT pair 16 decreases, such that the HEVT 16 experiences congestion, then the source and destination voice gateways 10, 12 will coordinate to identify sufficient low priority MLPP calls to be cleared, in order to take the HEVT 16 out of congestion, and thus to allow any higher priority calls to continue. If the drop in the available bandwidth is such that the source, and destination, gateways 10, 12 are no longer able to communicate, then the two gateways 10, 12 will use a selection method, which maximizes the probability of identifying the same lower priority MLPP calls to be dropped, so as to ensure that, the same calls are dropped by both gateways 10, 12. When the available bandwidth has returned to a level that the source, and destination, gateways 10, 12 are able to communicate again, then the gateways 10, 12 will confirm which calls are still active.

The MLPP Support on IP Networks according to the invention has the following key advantages over prior technology:

The method according to the invention would enable optimum use of the available bandwidth for any mix of MLPP marked calls.

The method according to the invention would allow higher priority calls to be accepted even if the bandwidth were congested, by pre-empting lower priority calls.

The method according to the invention would retain the higher priority calls if the bandwidth decreased, by dropping the lower priority calls.

As the HEVTs, and the associated voice gateways, are transmission media agnostic, it will be possible to support voice calls whose source, and destination, transmission media were completely different, e.g. Circuit Switched to VoIP. The HEVTs, and associated voice gateways, are therefore ideally placed to support a seamless migration from Circuit Switched voice to VoIP carried over IPv4 or IPv6, as shown in FIG. 2.

This embodiment of the invention is intended to be used by the Multi-Level Secure VoIP Gateway and the Secure Domain VoIP Gateway, where it will be a key enabler to allow efficient communication between these devices.

REFERENCE NUMERALS AND ACRONYMS 10 voice gateway
12 voice gateway
14 IP network
16 HEVT
18 Voice PABX
20 VoIP phone
22 analog/digital phone
24 voice data packet
25 interface
26 voice data packets transceiver
28 HEVT Interface
30 HEVT packet payload processor
32 HEVT packet header processor
34 HEVT packet transceiver
36 DAMA modem
38 HEVT bandwidth controller
40 MLPP controller
42 CAC controller
CAC Call Admission Control
DAMA Demand Assigned Multiple Access
DSCP Differentiated Services Code Point
HEVT High Efficiency Voice Trunk
IP Internet Protocol
MLPP Multi-level Priority and Pre-emption
PABX Private Automatic Brach Exchange
RTP Real-Time Transport Protocol
UDP User Datagram Protocol
VAD Voice Activity Detection
VoIP Voice over IP

What is claimed is:

1. A voice gateway for transmitting voice data to a receiving voice gateway in a packet-switched network by establishing a voice trunk, the voice gateway comprising:
a transceiver configured to receive packets transmitting voice data between the voice gateway and the receiving voice gateway, wherein each received packet comprises header data and voice media payload from one or more voice flows;
an interface configured to establish a voice trunk between the voice gateway and the receiving voice gateway based on the header data of the received packets;
a processor configured to extract and combine the voice media payloads of the received packets into a single packet, wherein the single packet comprises for a voice call a dedicated channel data of the established voice trunk comprising an identifier of the respective voice call and the voice media payload of the respective voice call;
a processor configured to add a single set of header data to the single packet, wherein the single set of header data comprises base information for synchronizing the flow of data between the voice gateway and the receiving voice gateway;
a transceiver configured to transmit the single packet to the receiving voice gateway via the voice trunk;
a demand assigned multiple access modem; and
a bandwidth controller configured to control bandwidth required for voice calls, and
to:
determine demand assigned multiple access congestion and to clear voice calls from the voice trunk depending on determined demand assigned multiple access congestion, or
detect voice activity or suppress silence of voice calls and to control bandwidth requirements for voice calls depending on detected voice activity and silence.

2. The voice gateway of claim 1, wherein
a voice trunk pair is established on admission of the first call, or
the voice trunk is established on association between the voice gateways.

3. The voice gateway of claim 1, wherein the bandwidth controller is further configured to select voice calls to be cleared, for which a probability is minimized that the voice gateway and the receiving voice gateway attempt to pre-empt a same voice call at a same time.

4. The voice gateway of claim 1, further comprising:
a controller configured to prioritize voice calls; and
a controller configured to control call admission based on the prioritizing of voice calls and voice call clearing selection.

5. The voice gateway of claim 4, wherein the controller configured to prioritize voice calls comprises a multi-level priority and preemption controller configured to allocate multi-level priority and preemption values to voice calls.

6. The voice gateway of claim 5, wherein the controller configured to control call admission is further configured to clear voice calls depending on their allocated multi-level priority and preemption values and under control of the bandwidth controller.

7. A method for transmitting voice data between voice gateways in a packet network by establishing a voice trunk comprising the acts of:
receiving packets transmitting voice data between the voice gateways, wherein each received packet comprises header data and voice media payload;
extracting and combining the voice media payloads of the received packets into a single packet, wherein the single packet comprises for each voice call dedicated channel data of the voice trunk comprising an identifier of the respective voice call and the voice media payload of the respective voice call;
adding a single set of header data to the single packet, wherein the single set of header data comprises base information for synchronizing the flow of data between the voice gateways; and
transmitting the single packet via the voice trunk; and
controlling required bandwidth for voice calls by
determining demand assigned multiple access congestion and clearing voice calls from the voice trunk depending on determined demand assigned multiple access congestion, or
detecting voice activity or suppressing silence of voice calls and controlling the bandwidth requirements for voice calls depending on detected voice activity and silence
wherein the act of controlling the required bandwidth for voice calls further comprises the acts of selecting voice calls to be cleared, for which a probability is minimized that the voice gateways attempt to pre-empt the same voice call at a same time.

8. The method of claim 7, further comprising the act of:
identifying calls to be dropped when the voice gateways can no longer communicate in order to maximize a number of retained calls when the gateways reestablish communication.

9. The method of claim 7, further comprising the acts of:
prioritizing voice calls; and
performing call admission control based on the prioritizing of voice calls and voice call clearing selection methods,
wherein the act of prioritizing voice calls comprises allocating multi-level priority and preemption values to voice calls,
wherein the act of performing call admission control comprises clearing voice calls depending on their allocated multi-level priority and preemption values and under control of the act of controlling the required bandwidth for voice calls.

10. A non-transitory computer-readable medium storing code, which when executed by a processor, causes the processor to:
receive packets transmitting voice data between the voice gateways, wherein each received packet comprises header data and voice media payload;
extract and combining the voice media payloads of the received packets into a single packet, wherein the single packet comprises for each voice call dedicated channel data of the voice trunk comprising an identifier of the respective voice call and the voice media payload of the respective voice call;
add a single set of header data to the single packet, wherein the single set of header data comprises base information for synchronizing the flow of data between the voice gateways; and
transmit the single packet via the voice trunk; and
control required bandwidth for voice calls by
determining demand assigned multiple access congestion and clearing voice calls from the voice trunk depending on determined demand assigned multiple access congestion, or detecting voice activity or suppressing silence of voice calls and controlling the bandwidth requirements for voice calls depending on detected voice activity and silence wherein the controlling the required bandwidth for voice calls further comprises the acts of selecting voice calls to be cleared, for which a probability is minimized that the voice gateways attempt to pre-empt the same voice call at a same time.

11. The non-transitory computer-readable medium of claim 10, further comprising code, which when executed by the processor, causes the processor to:

identify calls to be dropped when the voice gateways can no longer communicate in order to maximize a number of retained calls when the gateways reestablish communication.

12. The non-transitory computer-readable medium of claim 10, further comprising code, which when executed by the processor, causes the processor to:

prioritize voice calls; and perform call admission control based on the prioritizing of voice calls and voice call clearing selection methods, wherein the prioritizing voice calls comprises allocating multi-level priority and preemption values to voice calls, wherein the call admission control comprises clearing voice calls depending on their allocated multi-level priority and preemption values and under control of the act of controlling the required bandwidth for voice calls.

* * * * *